United States Patent Office 3,397,351
Patented Aug. 13, 1968

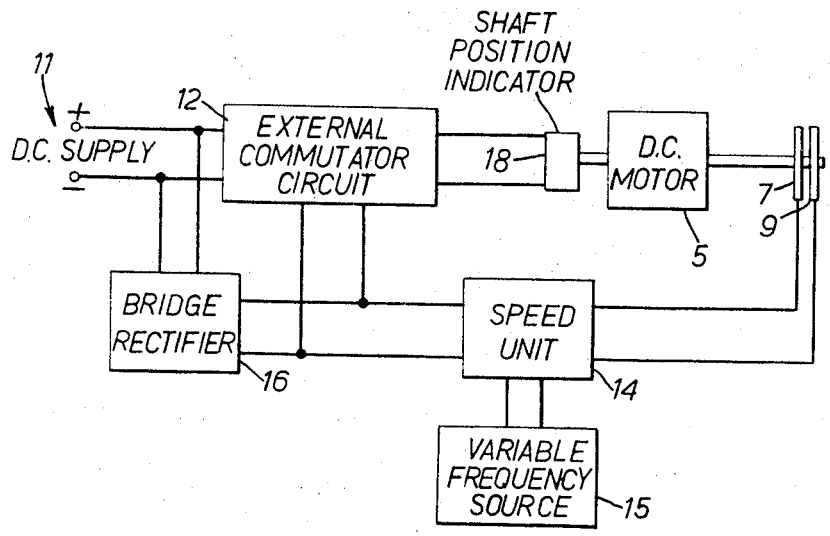
FIG./.
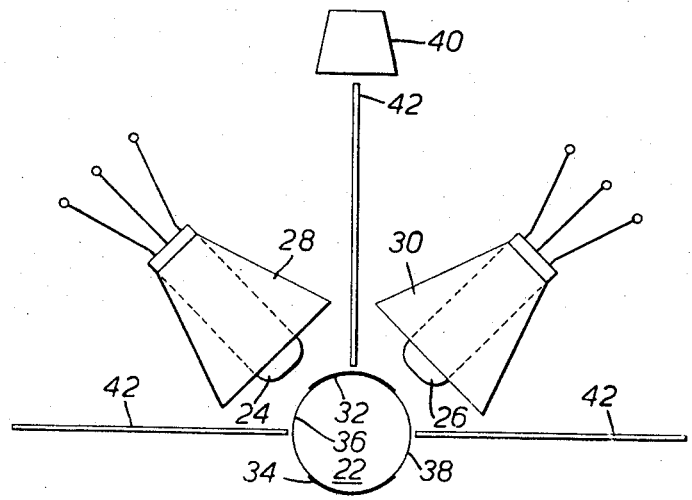
FIG.2.

3,397,351
ELECTRIC MOTORS INCLUDING A ROTOR FED FROM AN EXTERNAL COMMUTATION SYSTEM
Eric Wolfendale, Bracknell, England, assignor to Racal Communications Limited, Bracknell, England, a British company
Filed Nov. 8, 1965, Ser. No. 506,765
Claims priority, application Great Britain, Nov. 10, 1964, 45,773/64
12 Claims. (Cl. 318—138)

The invention relates to D.C. motor control systems.

According to one aspect of the invention, there is provided a D.C. motor control system for use with a D.C. motor having its armature winding connected to slip rings instead of a segmented commutator, comprising an external commutator circuit for connection between an electric power supply and the slip rings to supply current to the armature through the slip rings and operative when actuated to reverse the direction of current flow in the armature, and radiation responsive means arranged to be responsive to radiation signals produced according to the instantaneous position of the motor shaft, the said radiation responsive means being operative to actuate the external commutator circuit at instants during each revolution of the motor shaft such that the instantaneous direction of current flow through the armature correctly polarises the latter to maintain rotation of the motor shaft.

According to another aspect of the invention, there is provided a D.C. motor control system for use with a D.C. motor having the ends of its armature winding connected to two slip rings instead of to a segmented commutator, comprising a transformer having a secondary winding for connection between the two slip rings and a primary winding having an intermediate point connected to an input terminal the latter being for connection to one pole of a D.C. supply, two controlled rectifiers each connected between a respective end of the primary winding and a further input terminal, the latter being for connection to the other pole of the D.C. supply, and control means responsive to the instantaneous position of the motor shaft for rendering the controlled rectifiers conductive alternately so as to cause current to flow through the primary winding alternately in opposite directions and to induce corresponding current in the secondary winding, the control means being so responsive to the instantaneous position of the motor shaft that the instantaneous direction of current flow through the armature correctly polarises the latter to maintain rotation of the motor shaft.

According to a further aspect of the invention, there is provided a D.C. motor control system for use with a D.C. motor having the ends of its armature winding connected to two slip rings instead of a segmented commutator comprising an external commutator circuit for connection between an electrical power supply and the said slip rings to supply current to the armature through the slip rings and operative when actuated to reverse the direction of current in the armature, means responsive to the instantaneous position of the motor shaft for actuating the said external commutator circuit during each revolution of the motor shaft such that the consequent current reversal in the armature winding tends to maintain the motor shaft rotating, and a pair of controlled rectifiers interposed between the said external commutator circuit and the said slip rings and operative in dependence upon a control signal for controlling the speed of the motor.

According to yet a further aspect of the invention there is provided a D.C. motor control system for use with a D.C. motor having the ends of its armature winding connected to two slip rings instead of to a segmented commutator, comprising an external commutator circuit for connection between an electrical power supply and said slip rings to supply current to the armature through the slip rings and operative when actuated to reverse the direction of current flow in the armature, means responsive to the instantaneous position of the motor shaft for so actuating the external commutator circuit during each revolution of the armature such that the corresponding current reversal in the armature tend to maintain the motor shaft rotating, and means including two controlled rectifiers connected in series with the input of the external commutator and also including means operative in dependence upon a control signal for so varying the conduction of the controlled rectifiers so as to vary the speed of the motor.

A D.C. control system embodying the invention will now be described by way of example and with reference to the accompanying drawings in which:

FIGURE 1 is a schematic diagram of the circuit of the system;

FIGURE 2 shows an arrangement for indicating the instantaneous position of the motor shaft;

Figure 3:
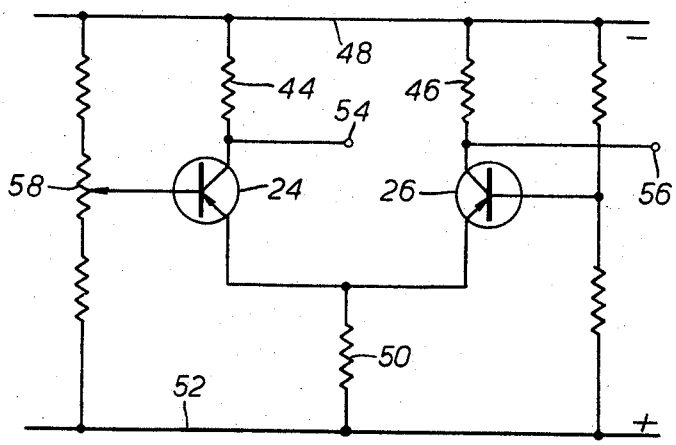
FIGURE 3 shows the electrical circuit of the arrangement of FIGURE 2.

The D.C. motor control system to be described is for use with a D.C. motor from which the normal segmented rotating commutator has been omitted. As shown diagrammatically in FIGURE 1, the D.C. motor 5 has the two ends of its armature winding brought out and electrically connected to respective slip rings 7 and 9 which run in contact with brush gear not illustrated. The slip rings 7 and 9 are connected to a source 11 of D.C. supply through an external commutator circuit 12. The connections between the external commutator circuit 12 and the slip rings 7 and 9 include a speed control unit 14 controlled by a variable frequency source 15; for the time being, the unit 14 will be ignored. A bridge rectifier unit, the purpose of which will be explained later, is connected between the output and input of the commutator circuit 12.

The D.C. motor 5 is a 4 pole machine with a conventional stator winding, the connections to which are not shown.

The armature shaft of the motor 5 drives a shaft position indicator 18 which is connected to the external commutating circuit 12 and controls the latter in dependence upon the position of the armature shaft.

In operation, the D.C. supply 11 is connected to slip rings 7 and 9 through the external commutator circuit 12. The polarity given to the slip rings 7 and 9 by the output from the external commutator circuit 12 is such that the current through the armature windings of the motor 5 so polarises the armature in relation to the stator poles that the armature rotates and drives the shaft position indicator 18. When the armature has rotated to such an extent that the polarity given to the armature winding by the current flowing therethrough is no longer correct, the shaft position indicator 18 produces a control signal to the external commutator circuit 12 causing the latter to reverse the polarity given to the slip rings 7 and 9, thus reversing the direction of current flow in the armature winding and once more giving the armature winding the correct polarity to maintain rotation. The operation continues in this manner, with the external commutator circuit 12 reversing the direction of current flow in the armature winding at the correct instants during each revolution of the armature shaft so as to maintain continuous rotation of the armature shaft. It will be appreciated that the number of current reversals which are produced during each revolution of the armature shaft, by the external commutator circuit 12 depends on the number of poles of the motor. It will be seen that the external commutator circuit 12, in conjunction with the shaft position indicator 18 performs the same function as does the conventional segmented commutator mounted on the shaft of normal D.C. motors.

FIGURE 2 shows a diagrammatic end view of the armature shaft 22 and illustrates the shaft position indicator 18. Mounted above the shaft are two photo-transistors 24 and 26 which are located in respective conical reflectors 28 and 30. A peripheral strip of the shaft 22 in the region of the photo-transistors 24 and 26 is divided into four quadrants. Two of these quadrants, quadrants 32 and 34, are made non-light-reflective; the other two quadrants, quadrants 36 and 38, are made light-reflective. A light source 40 (producing visible or non-visible light) is provided to direct light onto the shaft in the region of the photo-transistors, and blackened screens 42 are provided which, in conjunction with the conical reflectors 28 and 30, ensure that each photo-transistor can only view a portion of the periphery of the shaft of the same circumferential length as that of one of the four quadrants 32 and 38.

The two photo-transistors 24 and 26 are electrically connected in the differential circuit shown in FIGURE 3. Each photo-transistor has a respective collector resistor 44, 46, connected to a negative supply line 48, and the two transistors having common emitter resistors 50 connected to the positive supply line 52. The bases of the photo-transistors 24 and 26 are respectively connected to bias networks connected between the supply lines 48 and 52. The output signals from the photo-transistors are produced at terminals 54 and 56. In use, the potential of the base of photo-transistor 24 is adjusted, by means of a potential divider 58, so that, when the shaft 22 of the armature is in the position illustrated in FIGURE 2 (that is, each photo-transistor 24 and 26 is receiving the same amount of light reflected off the shaft), the terminals 54 and 56 are at the same (relatively low) negative potential. The connection of the two photo-transistors in the differential circuit shown in FIGURE 3 ensures that any variation in ambient conditions such as temperature or supply voltage affects both transistors equally and prevents spurious output signals being produced.

If the shaft 22 of the motor 5 is assumed to be rotating clockwise as viewed in FIGURE 2, then it will be apparent that rotation of the shaft from the position shown in FIGURE 2 will cause the light reflected to the photo-transistor 24 to increase as the quadrant 36 passes through the field of view of the photo-transistor and then to decrease again as the quadrant 34 follows. The current through the transistor 24 therefore increases during this movement of the shaft, thus raising the potential of the terminal 54 positively, and then falls again as the quadrant 34 comes into the field of view. During the same movement of the shaft 22, the light reflected to photo-transistor 26 decreases as the quadrant 32 moves into the field of view of the transistor and then increases again as the quadrant 36 follows. During this movement of the shaft, the current through the photo-transistor 36 therefore decreases, producing a negative-going signal at the terminal 56, and then rises again. It will therefore be seen that, during each revolution of the shaft 22, two negative-going signals are produced at each of the terminals 54 and 56.

Figure 4:
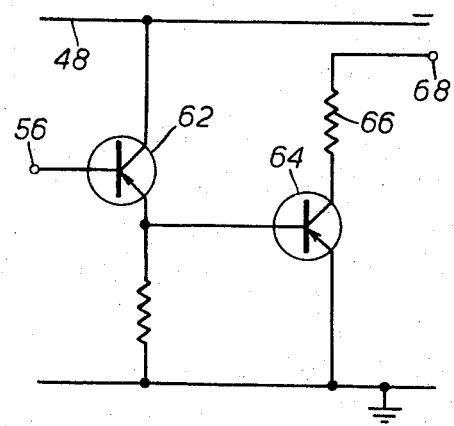
FIGURE 4 shows a firing circuit for connection to the circuit of FIGURE 3.

Each of the terminals 54 and 56 is connected to a respective firing circuit, the firing circuit connected to the terminal 56 being shown in FIGURE 4. The firing circuit connected to the terminal 54 is not illustrated but is identical to that shown in FIGURE 4. The firing circuit of FIGURE 4 comprises a transistor 62 connected through an emitter resistor between the power supply line 48 and earth, and having its base electrode connected to the terminal 56. The emitter terminal of the transistor 62 is connected to the base of the further transistor 64 whose collector is connected through a limiting resistor 66 to an output terminal 68 which provides a firing signal controlling the external commutator circuit 12 in a manner to be described.

Figure 5:
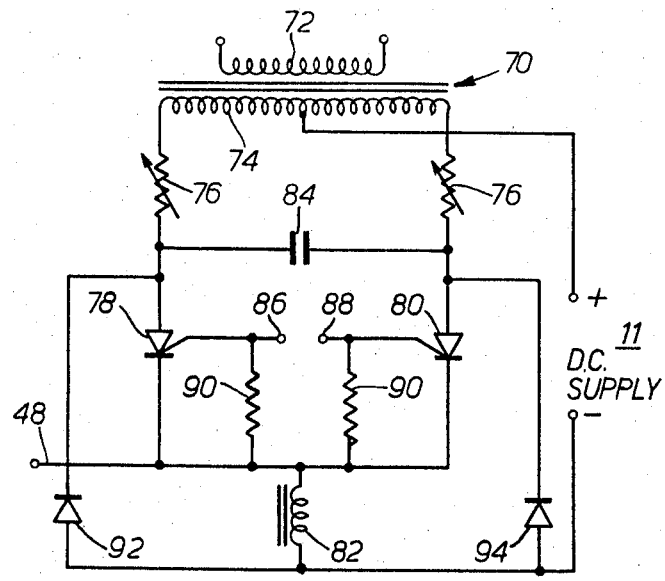
FIGURE 5 shows the electrical circuit of the external commutator circuit shown in block form in FIGURE 1.

The external commutator circuit 12 will now be described with reference to FIGURE 5. The circuit includes a transformer 70 having a secondary winding 72 connected to the slip rings 7 and 9 (see FIGURE 1). The primary winding 74 of the transformer has a centre tap connected to the positive pole of the D.C. supply 11. The two ends of the primary winding 74 are respectively connected through adjustable resistor 76 to the anodes of two silicon controlled rectifiers 78 and 80 whose cathodes are connected through a common choke winding 82 to the negative pole of the D.C. supply 11. The anodes of the silicon controlled rectifiers 78 and 80 are interconnected through a capacitor 84. The gate electrodes of the two silicon controlled rectifiers are respectively connected to the terminals 86 and 88 and are also connected to the negative supply line 48 (see FIGURES 3 and 4) through resistors 90. The terminal 88 is directly connected to the output terminal 68 of the firing circuit shown in FIGURE 4, that is, the firing circuit controlled by the photo-transistor 26. The terminal 86 is directly connected to the output terminal (that is, that terminal corresponding to the terminal 68 in FIGURE 4) of the firing circuit controlled by the photo-transistor 24.

In operation, the silicon controlled rectifier 78 and 80 in the external commutator circuit 12 are rendered conductive alternately by the photo-transistors 24 and 26. As the shaft 22 rotates clockwise from the position shown in FIGURE 2, the photo-transistor 26 will, as explained, cause a negative-going signal to be produced at the terminal 56. This signal will cut-off the transistor 62 in the firing circuit (see FIGURE 4) causing the transistor 64 to be bottomed, current flowing to the negative supply line 48 (see FIGURE 5) through the terminal 88 and the appropriate resistor 90. The gate electrode of the silicon controlled rectifier 80 therefore receives a positive pulse rendering the rectifier conductive and causing the D.C. supply line 11 to pass a pulse of current through one half of the primary winding 74. A pulse of current, of appropriate polarity, is therefore supplied from the secondary winding 72 to the armature winding of the motor 5 through the slip rings 7 and 9. As the motor continues to rotate, a negative-going pulse is produced, in the manner described, from the terminal 54 (see FIGURE 3) causing the transistor corresponding to the transistor 64 in the firing circuit connected to the terminal 54 to be bottomed, thus raising the terminal 86 (see FIGURE 5) positively. The silicon controlled rectifier 78 is therefore rendered conductive and, by means of the choke 82 and the capacitor 84, the rectifier 80 is at the same time rendered non-conductive. A pulse of current is therefore passed through the other half of the primary winding 74 from the D.C. supply 11 causing a corresponding current pulse to flow from the secondary winding 72 through the armature winding, the direction of current flow in the armature being opposite to that obtaining when the silicon controlled rectifier 80 was rendered conductive. The reflecting and non-reflecting quadrants 32 to 38 on the shaft 22 are so positioned in relation to the manner in which the armature is wound that the photo-transistors 24 and 26 cause the external commutator circuit 12 to provide pulses of current through the armature winding in such directions and at such instants during each revolution of the shaft as to maintain the motor rotating.

The external commutator circuit 12 includes two diodes 92 and 94 which provide a path for any reverse transient currents which may occur owing to inductance in the armature winding and in the transformer 70. The resistors 76 limit the current which flows under starting conditions.

Figure 6:
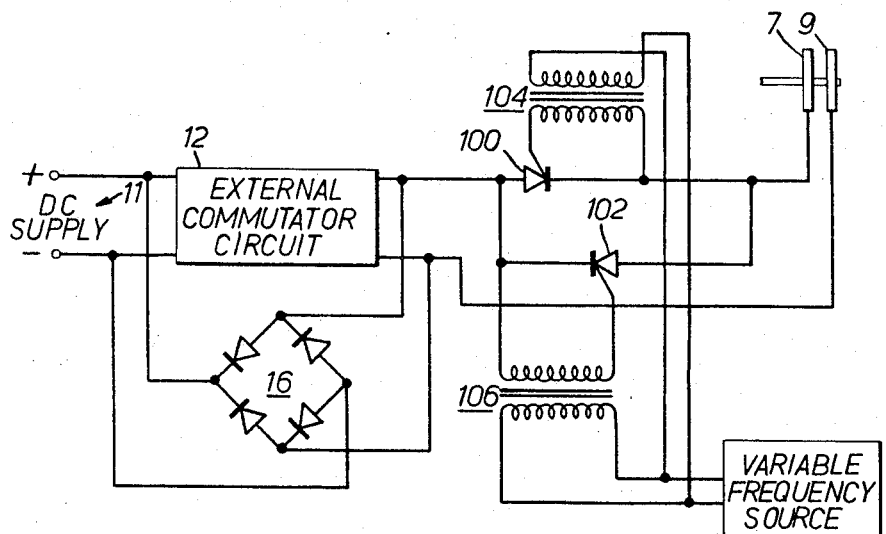
FIGURE 6 shows the motor control system of FIGURE 1 in greater detail to illustrate a system of speed control.

The speed control unit 16 will now be described with reference to FIGURES 6 and 7. FIGURE 6 shows the system redrawn with the motor 5 and shaft position indicator 18 omitted.

The speed control unit 16 comprises a pair of silicon control rectifiers 100 and 102 which are connected in parallel and in opposition in the line between the external commutator circuit 12 and the slip rings 7. Conduction of the silicon controlled rectifiers 100 and 102 is controlled by means of respective transformers 104 and 106. The primary windings of the transformers 104 and 106 are supplied with the same control signal from the variable frequency source 15, but the transformers are so wound that the voltage produced across the secondary winding of the transformer 104 is in anti-phase to the voltage produced across the secondary winding of the transformer 106. It will be apparent that the voltage applied to the gate electrode of the rectifier 100 by the secondary winding of transformer 104 will be positive during half cycles of the control voltage of one polarity (during positive half cycles, for example), so that provided the voltage applied across the rectifier 100 by the external commutator circuit 12 is of the appropriate polarity the rectifier 100 will be conductive; similarly, the voltage applied to the gate electrode of the rectifier 102 by the secondary winding of the transformer 106 during negative half cycles of the control voltage will be such as to render the rectifier 102 conductive, provided again that the voltage applied across the rectifier 102 by the external commutator circuit 12 is of the appropriate polarity. The speed of the motor (which determines the rate of operation of the external commutator circuit 12) will therefore tend to be maintained at a value so related to the frequency of the control voltage from the source 15 that the rectifiers 100 and 102 are rendered conductive alternately during successive half cycles of the control voltage. When this condition obtains, it will be seen that each current reversal produced by the external commutator circuit 12 switches off the one of the controlled rectifiers 100 and 102 which is conducting.

Figure 7:
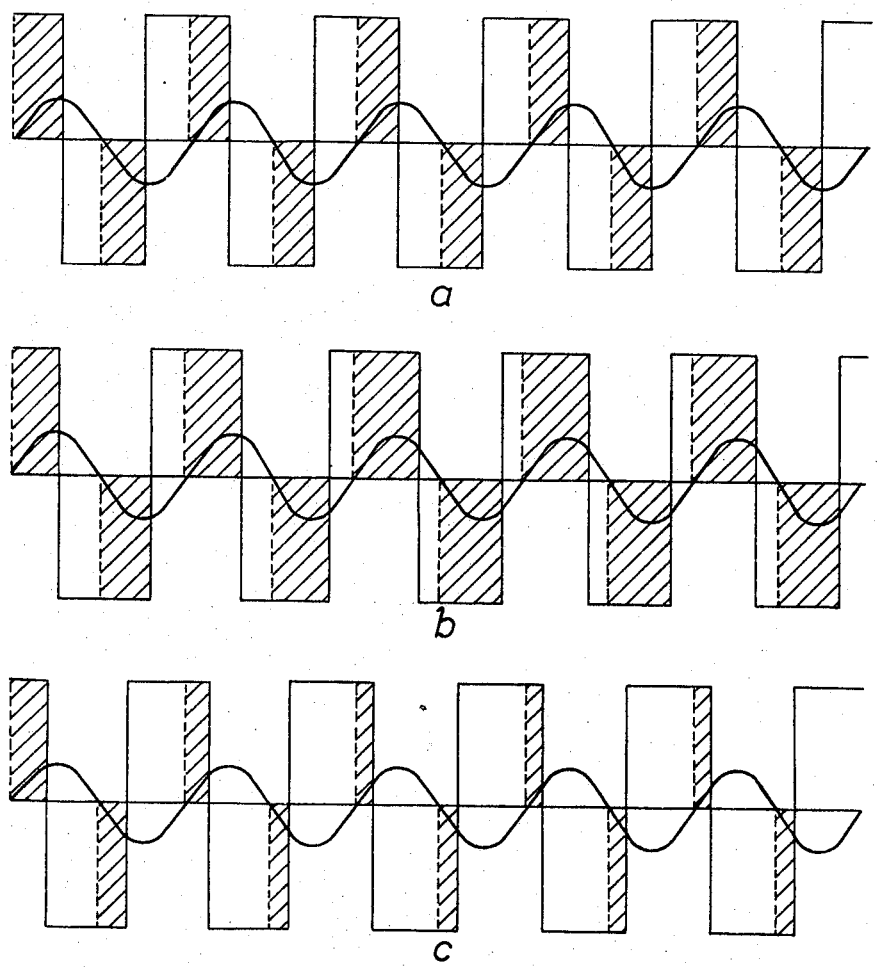
FIGURE 7 shows waveforms occurring in the system under various conditions.

FIGURE 7 shows wave forms obtaining in the system under steady speed conditions with varying loads on the motor. The square wave forms represent the output voltage of the external commutator circuit 12 and the sine wave forms represent the control voltage from the source 15. The shaded portions of the square waveforms indicate the time during which current actually flows to the armature winding from the external commutator circuit 12.

In FIGURE 7(a), the motor is running under partly loaded conditions, and it will be seen that the motor speed is such that the voltage output of the external commutator circuit 12 is synchronized with the control voltage from source 15. Current can only flow from the commutator circuit 12 to the motor armature, however, during the period in each half cycle of the control voltage when one or other of the rectifiers 100 and 102 is conducting. FIGURE 7(a) shows that the motor settles down to a condition in which the control voltage and the voltage output of the external commutator circuit 12 are so phase-related that the armature takes currents for approximately half of each voltage pulse from the commutator circuit 12.

In FIGURE 7(b) the load on the motor has been increased. The increase in motor load causes the motor speed to drop slightly and this results in a change of phase between the voltage from the external commutator circuit 12 and the control voltage from the source 15 in such a direction that the time in each half cycle of the voltage from the commutator circuit 12 during which current actually flows through the armature increases until the mean current provided is sufficient to keep the motor running in synchronism with the control voltage from the source 15, and to provide the increased torque for the load.

If the load is removed, the motor tends to speed up momentarily and the opposite effect occurs, as shown in FIGURE 7(c). The phase difference between the voltage from the external commutator circuit 12 and the control voltage from the source 15 changes in such a direction as to reduce the time in each half cycle of the voltage from the external commutator 12 during which current actually flows to the armature, until the mean current is just sufficient to keep the motor running in synchronism with the control voltage.

It will therefore be apparent that, within the limits of the motor parameters the motor always runs at such speed that the voltage waveform from the external commutator circuit 12 is in synchronism with the control voltage from the source 15, the phase relationship between the waveforms adjusting itself automatically to provide the necessary current to the armature. As the frequency of the control voltage from the source 15 is varied, by means of a manual control for example, the motor speed will follow automatically in order to maintain such phase relationship between the two waveforms as provides the necessary mean current to the armature.

The bridge rectifier unit 16 is provided to return the energy from the secondary winding 72 of the transformer 70 in the external commutator circuit 12 to the D.C. supply 11 during the period when both of the rectifiers 100 and 102 in the speed control unit 16 are non-conductive.

The motor may be started by giving the armature shaft an initial slight rotation by hand. Alternatively starting can be achieved by connecting the two silicon control rectifiers 78 and 80 (FIGURE 5) directly to the armature winding through a starting switch (that is, the transformer 70 is temporarily disconnected). During this period, resistors are included to limit the starting current, and once the motor is rotating, the transformer 70 is switched into the circuit and the speed control unit 16 brought into operation. The ability of the shaft position indicator 18 to produce an output indicative of the shaft position even when the shaft is stationary enables this starting procedure to be followed.

In another embodiment of the invention, speed control is effected by using a pair of controlled rectifiers connected in the circuit between the D.C. supply 11 and the external commutator circuit 12, instead of between the external commutator circuit 12 and the slip rings. In such a system it may be advantageous or necessary to control these controlled rectifiers by means of firing pulses derived from the output of the external commutator circuit 12; in this way, a delay circuit can be incorporated to prevent harmful coincidence between the switching of the speed regulating controlled rectifiers and the switching of the controlled rectifiers in the external commutator circuit 12.

What is claimed is:
1. A D.C. motor control system comprising
a D.C. motor having a stator winding and an armature rotor winding,
a pair of continuous non-segmented slip rings rotating with the armature winding,
means connecting the armature winding to the said slip rings,
an electric power supply source,
an external commutator circuit having input and output terminals and connections therebetween,
reversing means in said external commutator circuit for reversing the connections between the input and output terminals thereof,
means connecting the input terminals of the external commutator circuit to the electric power supply source,
means connecting the output terminals of the external commutator circuit to the slip rings to supply current to the armature winding through the slip rings, position-responsive means including means driven by rotation of said armature winding and producing radiation signals according to the instantaneous position of the armature winding with respect to the stator winding and means responsive to said radiation signals to produce corresponding control signals, and means interconnecting the position-responsive means and the external commutator circuit whereby each said control signal actuates the said reversing means in the external commutator circuit to reverse the connections between the said input and output terminals thereof, the position-responsive means being arranged so that the said control signals occur at such instants that the external commutator circuit maintains the armature winding continuously correctly polarised with respect to the stator winding.

2. A system according to claim 1, in which the position-responsive means comprises a member rotating with the armature winding, a pair of photo-electric cells positioned adjacent the said member, means dividing the periphery of the said member into $n$ segments (where $n$ is the number of poles of the motor), means rendering the segments successively light-reflective and light-absorbent around the said periphery of the member, screening means confining the field of view of each said photo-electric cell to a portion of the periphery of the said member which is equal in length to a said segment, and light-responsive means mounted in spaced relationship with the said member to direct light on to the member.

3. A system according to claim 2, in which each photo-electric cell is a photo-transistor having a collector, a base and an emitter, and including two supply lines, two collector resistors respectively connected between one said line and the collectors of the photo-transistors, a single emitter resistor connected between the other said line and the emitters of both photo-transistors, a pair of output terminals respectively connected to the collectors of the two photo-transistors, two biasing networks each connected across the two said lines, and means connecting each said base to a respective said biasing network to bias the photo-transistors so that they conduct substantially equally when they are equally illuminated by light from the said light source reflected from the periphery of the said member, whereby rotation of the said member from the position in which both photo-transistors are equally illuminated produces a said control signal at a said output terminal.

4. A D.C. motor control system, comprising a D.C. motor having a stator winding and an armature rotor winding, a pair of continuous non-segmented slip rings respectively connected to the ends of the armature winding and rotating therewith, a transformer having a primary winding and a secondary winding, means connecting the secondary winding between the two said slip rings, a D.C. power supply source, means connecting one pole of the D.C. source to an intermediate point in the said primary winding, two controlled rectifiers each connected between a respective end of the primary winding and the other pole of the D.C. source, each controlled rectifier having a gate electrode controlling the conduction through the rectifier and an anode electrode and a cathode electrode, control means responsive to the instantaneous position of the armature winding with respect to the stator winding, to produce control signals in dependence thereon, and means connecting the control means to the said gating electrodes whereby the said control signals from the control means render the controlled rectifiers conductive alternately so that the said secondary winding directs current through the armature alternately in opposite directions to maintain the armature winding continuously correctly polarised with respect to the stator winding.

5. A system according to claim 4, in which the said controlled rectifiers are semi-conductor controlled rectifiers, and including a capacitor connected between the anode electrodes of the controlled rectifiers and an inductor connected to the cathode electrodes of the controlled rectifiers in series with both rectifiers, the capacitor and inductor being arranged to render each controlled rectifier non-conductive when the other controlled rectifier is rendered conductive.

6. A system according to claim 4, in which the said control means comprises a member rotating with the said armature winding, a pair of photo-electric cells positioned adjacent the said member, means dividing the periphery of the said member into $n$ segments (where $n$ is the number of poles of the motor), means rendering the segments successively light-absorbent around the said periphery of the member, screening means confining the field of view of each photo-electric cell to a portion of the periphery of the said member equal in length to a said segment, light source means directing light on to the said member, output circuit means connected to the photo-electric cells to produce said control signals according to the amount of said light reflected to the said photo-electric cells, and means connecting the output circuit means to said gating electrodes whereby each said control signal controls the conduction of a said controlled rectifier.

7. A system according to claim 6, in which each photo-electric cell is a photo-transistor having a collector, a base and emitter, and in which said output circuit means includes two supply lines, a source of voltage connected across the armature winding and rotating therewith, a transformer having a primary winding and a secondary winding, means connecting the secondary winding between the two said slip rings, a D.C. power supply source, means connecting one pole of the D.C. source to an intermediate point in the said primary winding, two controlled rectifiers each connected between a respective end of the primary winding and the other pole of the D.C. supply source, each controlled rectifier having a gate electrode controlling the conduction through the rectifier and an anode electrode and a cathode electrode, control means responsive to the instantaneous position of the armature winding with respect to the stator winding, to produce control signals in dependence thereon, and means connecting the control means to the said gating electrodes whereby the said control signals from the control means render the controlled rectifiers conductive alternately so that the said secondary winding directs current through the armature alternately in opposite directions to maintain the armature winding continuously correctly polarised with respect to the stator winding.

8. A D.C. motor control system, comprising a D.C. motor having a stator winding and armature rotor winding,
a pair of non-segmented slip rings rotating with the armature winding,
means respectively connecting the ends of the armature winding to the said slip rings,
an electrical power supply source,
an external commutator circuit having input and output terminals and connections therebetween,
reversing means in said external commutator circuit for reversing the connections between the input and output terminals thereof,
means connecting the input terminals of the external commutator circuit to the electrical power supply source,
means connecting the output terminals of the external commutator circuit to the said slip rings to supply current to the armature winding through the said slip rings,
control means responsive to the instantaneous position of the armature winding with respect to the stator winding and operative to produce corresponding control signals,
means interconnecting the control means and the external commutator circuit whereby each said control signal actuates the said reversing means in the said external commutator circuit to reverse the direction of current in the armature winding,
the control means being arranged so that the said control signals occur at such instants that the external commutator circuit maintains the armature winding continuously correctly polarised with respect to the stator winding,
at least one controlled rectifier interposed between the said output terminals of the external commutator circuit and the said slip rings,
the controlled rectifier having a gating electrode for controlling its conduction and an anode electrode and a cathode electrode,
and a variable signal source connected to the said gating electrode for controlling the conduction of the controlled rectifier to control the power supplied to the motor and so to control the speed of the motor.

9. A system according to claim 8, including
two said controlled rectifiers,
means connecting the controlled rectifiers in parallel with each other and in opposition,
and means connecting the parallel-connected controlled rectifiers in the connection between the said external commutator circiut and the slip rings.

10. A system according to claim 9, in which the said variable signal source comprises
means producing a variable frequency alternating voltage signal,
means applying the said variable frequency alternating voltage signal between the gate electrode and the cathode electrode of one controlled rectifier,
means responsive to the said variable frequency alternating voltage signal producing a further signal in anti-phase to the said variable frequency alternating voltage signal,
and means applying the said further signal between the gate electrode and the cathode electrode of the other controlled rectifier.

11. A system according to claim 8, in which the said control means comprises a member rotating with the said armature winding,
a pair of photo-electric cells positioned adjacent the said member,
means dividing the periphery of the said member into $n$ segments (where $n$ is the number of poles of the motor),
means rendering the segments successively light-reflective and light-absorbent around the said periphery of the member,
screening means confining the field of view of each photo-electric cell to a portion of the periphery of the said member equal in length to a said segment,
light source means directing light on to the said member,
and output circuit means connected to the photo-electric cells to produce said control signals according to the amount of said light reflected to the said photo-electric cells.

12. A D.C. motor control system, comprising
a D.C. motor having a stator winding and an armature winding,
a pair of non-segmented slip rings rotating with the armature winding,
means respectively connecting the ends of the armature winding to the two slip rings,
an electrical power supply source, an external commutator circuit having input and output terminals and connection therebetween,
reversing means in said external commutator circuit for reversing the connections between the input and output terminals thereof,
means connecting the input terminals of the external commutator circuit to the electrical power supply source,
means connecting the output terminals of the external commutator circuit to the said slip rings to supply current to the armature winding through the said slip rings,
at least one controlled rectifier interposed between the electrical power supply source and the said input terminals of the external commutator circuit,
control means responsive to the instantaneous position of the armature winding with respect to the stator winding to produce corresponding output signals,
means interconnecting the control means and the external commutator circuit whereby each said control signal actuates the said reversing means in the said external commutator circuit to reverse the direction of current flow in the armature winding, the control means being arranged so that the control signals are produced at such instants that the external commutator circuit maintains the armature winding continuously correctly polarised with respect to the stator winding,
and a variable signal source connected to the said controlled rectifier to control the conduction thereof so as to vary the speed of the motor.

References Cited

UNITED STATES PATENTS 3,131,341   4/1964   Kniazeff _____ 318—138

ORIS L. RADER, *Primary Examiner.*

G. SIMMONS, *Assistant Examiner.*